UNITED STATES PATENT OFFICE.

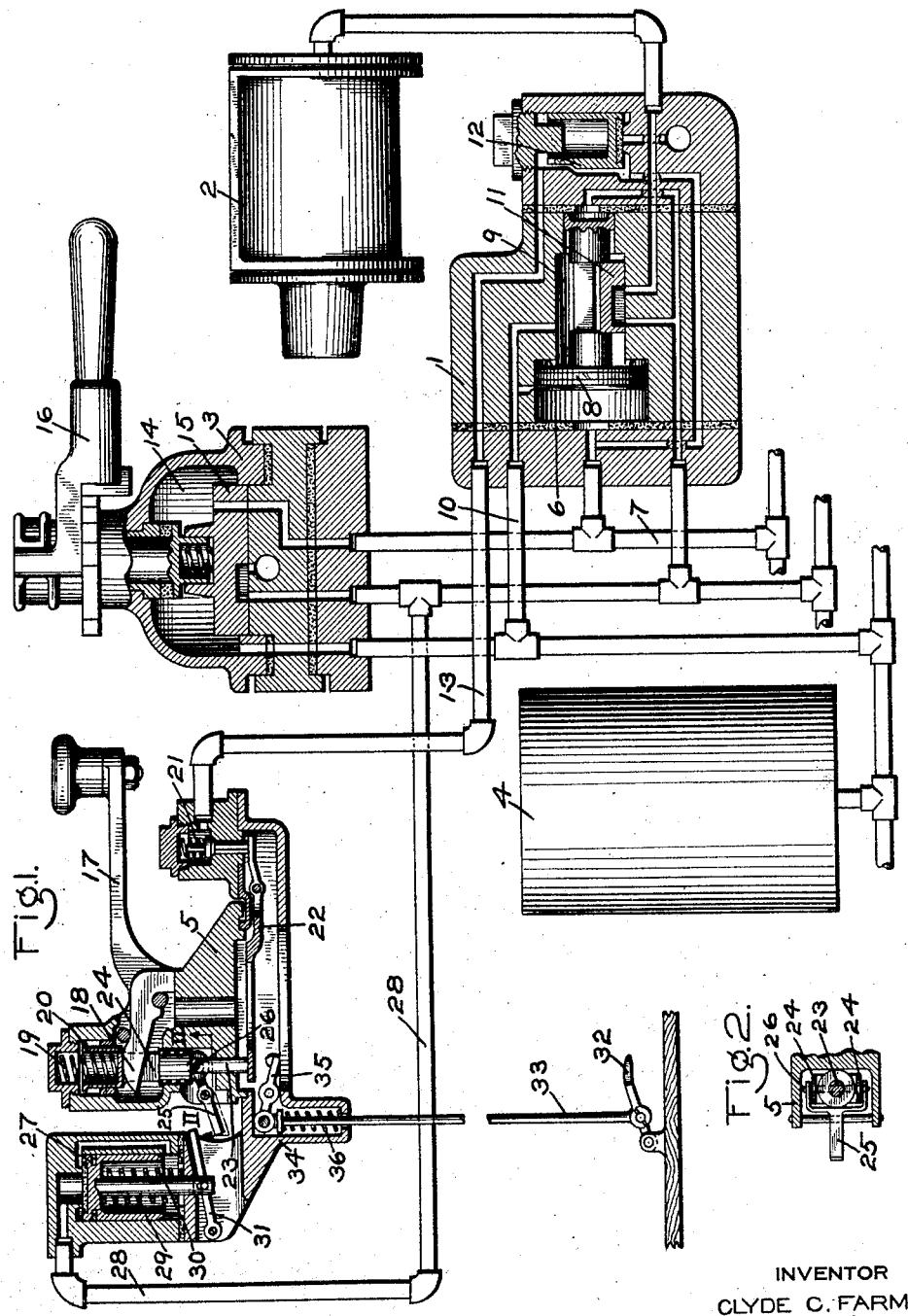

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL DEVICE.

1,400,596. Specification of Letters Patent. Patented Dec. 20, 1921.

Application filed July 27, 1920. Serial No. 399,250.

*To all whom it may concern:*

Be it known that I, CLYDE C. FARMER, a citizen of the United States, residing at Edgewood, in the county of Allegheny and State of Pennsylvania, have invented new and useful Improvements in Safety Car-Control Devices, of which the following is a specification.

This invention relates to a safety car control equipment, the safety features of which includes a controller handle adapted when released by the operator to effect an emergency application of the brakes.

It has heretofore been proposed to provide an equipment of the above character in which means are provided for preventing an emergency application of the brakes when the controller handle is released, if a straight air application of the brakes is made, or if a foot controlled valve device is operated by the foot of the operator.

In my pending application, Serial No. 330,785, filed October 15, 1919, is disclosed a controller handle and spring pressed means which operate to open a pilot valve for effecting an emergency application of the brakes when the operator releases the controller handle. If, however, a straight air application of the brakes is made, a mechanism is operated which prevents an emergency application of the brakes when the controller handle is released. With this construction, if the handle is removed after a straight air application of the brakes is made, the handle must be raised against the opposing force due to the straight air pressure.

One object of my invention is to provide a construction of the above character in which the handle is relieved of pressure tending to resist the removal thereof.

Another object of my invention is to provide a mechanical foot operated means for preventing an emergency application of the brakes when the controller handle is released.

In the accompanying drawing; Figure 1 is a diagrammatic view, with the principal parts in section, of a safety car control equipment embodying my invention; and Fig. 2 a section on the line II—II of Fig. 1.

As shown in the drawing, the construction may comprise an emergency valve device 1, a brake cylinder 2, a brake valve device 3, a main reservoir or source of fluid under pressure 4, and a safety controller handle device 5.

The emergency valve device 1 may comprise a casing having a piston chamber 6, connected to brake pipe 7, and containing piston 8, and a valve chamber 9, connected to the main reservoir 4 by pipe 10 and containing a slide valve 11. The casing may also contain the usual relay valve 12, having one side connected by pipe 13 to a pilot valve 21 in the controller handle device 5 and adapted upon operation to vent fluid under pressure from the brake pipe 7.

The brake valve device 3 may comprise the usual casing having a valve chamber 14, containing a rotary valve 15 adapted to be operated by handle 16 for controlling the application and release of the brakes.

The safety controller handle device 5 may comprise a casting on which a controller handle 17 is pivotally mounted. Said handle is provided with a finger 18 against which the pressure of a spring 19 normally acts through a movable member 20.

The pilot valve 21 engages one end of a pivotally mounted lever 22, the opposite end of which engages a vertically movable plunger 23.

The member 20 is provided with depending yoke arms 24, pivotally connected to a lever 25, the pivot pin 26 of which extends through the plunger 23.

Associated with the controller handle device 5 is a piston 27, subject on one side to the pressure in the straight air pipe 28 and on the opposite side to the pressure of a spring 29. The piston 27 is provided with a stem 30 to which is pivotally connected an arm 31, and the outer end of said arm is adapted upon movement of the piston 27 to engage the outer end of the pivoted lever 25.

The mechanical foot operated means for preventing an emergency application of the brakes upon release of the controller handle may comprise a pivotally mounted foot treadle 32 having a vertically disposed rod 33 pivotally connected thereto. Said rod extends into the controller handle base member 34 and is pivotally connected to one end of a pivotally mounted lever 35. The other end of the lever 35 is adapted to engage the pilot valve lever 22 when the treadle 32 is depressed. A spring 36 is mounted in the base member 34 and acts on the treadle mechanism with a tendency to hold the lever 35 out of engagement with the pilot valve lever 22.

In operation, when fluid is supplied to the brake pipe 7, the piston chamber 6 is maintained charged with fluid under pressure and the piston 8 with the slide valve 11 are held in release position, as shown in Fig. 1.

If the controller handle 17 is held depressed by the operator, the movable member 20 will be held in its upper position, preventing the plunger 23 from acting on the lever 22, so that the pilot valve 21 is allowed to remain in its closed position, as shown in the drawing.

If the controller handle 17 is released, the spring 19 acts to force the member 20 downwardly and through the yoke arm 24 the plunger 23 is also pressed downwardly, so that the lever 22 is operated to open the pilot valve 21 and vent fluid under pressure through pipe 13 from the top of the relay valve 12.

The relay valve 12 is then operated to vent fluid under pressure from piston chamber 6 of the emergency valve device 1 and from the brake pipe 7, so as to cause the movement of piston 8 and slide valve 11 to emergency position, in which fluid is supplied from the main reservoir 4, to the brake cylinder 2 to effect an emergency application of the brakes in the usual manner.

If a straight air application of the brakes is made, the controller handle 17 may be released without operating the pilot valve 21 to effect an emergency application of the brakes, since fluid from the straight air pipe 28 flows to the top of the piston 27 and operates same, so that the stem 30 acts to depress the arm 31. Said arm in its depressed position engages the lever 25 and thereby prevents the pressure of the spring 19 from acting to depress the plunger 23 when the operator releases the controller handle 17.

If a straight air application of the brakes has been made, the operator may easily remove the controller handle without the handle being subjected to the opposing force of the pressure due to the straight air application, as will be evident and furthermore, since there is a clearance space between the finger 18 and the plunger 23, the movement of the handle to remove the same will not operate to depress the plunger 23 and thus cause an emergency application of the brakes.

This feature is desirable in certain cases, such as where the car is brought into a car barn. In such case, the operator, by making a straight air application of the brakes, relieves the handle of pressure tending to resist removal and at the same time, the handle can be removed without making an emergency application of the brakes, thus avoiding the waste of air and sand which is supplied to the track in an emergency application.

In running, if the operator desires to use his hands, he may release the controller handle without causing an emergency application of the brakes by applying his foot to depress the treadle 32, so that the lever 35 is operated to prevent the movement of the pilot valve lever 22 by the action of the spring 19.

Having now described my invention, what I claim as new and desire to secure by Letters Patent, is:—

1. In a safety car control equipment, the combination with a controller handle and means for effecting an application of the brakes, of a device tending to operate said means and held inoperative by said handle, and means operated upon applying the brakes for also holding said device inoperative independently of said handle.

2. In a safety car control equipment, the combination with a controller handle and means for effecting an emergency application of the brakes, of a pressure actuated device tending to operate said means and normally held inactive by force applied to the handle and mechanism operated by fluid under pressure for also holding said device inactive, independently of the handle.

3. In a safety car control equipment, the combination with a straight air pipe, means for effecting an emergency application of the brakes, and a controller handle, of a spring tending to operate said means and acting to oppose movement of the handle and means operated by fluid under pressure supplied to the straight air pipe for holding said spring inactive independently of the handle.

4. In a safety car control equipment, the combination with a controller handle, a pilot valve, the operation of which is adapted to effect an emergency application of the brakes, a lever for operating said pilot valve, and a straight air pipe, of a movable member for actuating said lever, a spring acting on said member, and rendered inactive by pressure applied through the handle to said member, and means operated by pressure in the straight air pipe for rendering said member and spring inoperative without affecting said handle.

5. In a safety car control equipment, the combination with a pilot valve, the operation of which effects an emergency application of the brakes, a controller handle, and means operated upon release of the controller handle for actuating said pilot valve, of a mechanical mechanism operated by foot pressure for rendering said means inoperative when the controller handle is released.

6. In a safety car control equipment, the combination with a pilot valve, the operation of which effects an emergency application of the brakes and a lever for actuating said valve, of a movable member engaging said lever, a spring acting on said member, and a controller handle having a finger engaging said member in one direction only.

In testimony whereof I have hereunto set my hand.

CLYDE C. FARMER.